United States Patent [19]

Peppiatt

[11] Patent Number: 4,713,839
[45] Date of Patent: Dec. 15, 1987

[54] RESEALABLE REUSABLE FLEXIBLE PLASTIC BAG WITH LOOP HANDLE

[75] Inventor: Harry R. Peppiatt, Doylestown, Pa.

[73] Assignee: Paramount Packaging Corp., Chalfont, Pa.

[21] Appl. No.: 821,561

[22] Filed: Jan. 21, 1986

Related U.S. Application Data

[63] Continuation-in-part of Ser. No. 388,381, Jun. 14, 1982, Pat. No. 4,573,203.

[51] Int. Cl.⁴ .................... B65D 33/10; B65D 33/16
[52] U.S. Cl. ........................................ 383/29; 53/413; 383/41; 383/61; 383/65; 493/226
[58] Field of Search .................. 383/29, 8, 28, 15, 61, 383/6, 41, 65; 493/226; 53/413

[56] References Cited

U.S. PATENT DOCUMENTS

| | | | |
|---|---|---|---|
| Re. 25,966 | 2/1966 | Wilcox | 229/52 |
| 1,701,097 | 2/1929 | Broderick | 383/18 |
| 1,733,219 | 10/1929 | Duvall | 229/54 |
| 1,808,375 | 6/1931 | Plooster | 383/6 |
| 1,971,064 | 8/1934 | Corlette et al. | 383/103 |
| 2,679,969 | 6/1954 | Richter | 229/3.5 |
| 2,722,367 | 11/1955 | Verlin | 229/54 |
| 2,745,593 | 5/1956 | Brady | 229/54 |
| 3,006,532 | 10/1961 | Fine | 383/6 |
| 3,093,295 | 6/1963 | Kugler | 383/75 |
| 3,140,038 | 7/1964 | LaGuerre | 383/15 |
| 3,206,104 | 9/1965 | Cohen | 229/52 |
| 3,282,493 | 11/1966 | Kanelous | 206/626 |
| 3,283,994 | 11/1986 | Miller | 383/41 |
| 3,309,008 | 3/1967 | Huck | 383/29 |
| 3,339,606 | 9/1967 | Kugler | 229/62 |
| 3,370,630 | 2/1968 | Haugh et al. | 150/12 |
| 3,378,189 | 4/1968 | Dickson | 383/103 |
| 3,502,258 | 3/1970 | Kugler et al. | 206/620 |
| 3,507,943 | 4/1970 | Gerard | 383/103 |
| 3,568,918 | 3/1971 | Blomquist | 383/17 |
| 3,580,486 | 5/1971 | Kugler | 383/18 |
| 3,738,567 | 6/1973 | Ruda | 383/75 |
| 3,738,568 | 6/1973 | Ruda | 383/75 |
| 3,807,679 | 4/1974 | Burke et al. | 215/100 |
| 3,827,472 | 8/1974 | Uramoto | 383/61 |
| 3,998,380 | 12/1976 | Kanelous | 206/626 |
| 4,252,269 | 2/1981 | Peppiatt | 229/54 |
| 4,285,376 | 8/1981 | Ausnit | 383/61 |
| 4,573,203 | 2/1986 | Peppiatt | 383/29 |

FOREIGN PATENT DOCUMENTS

| | | | |
|---|---|---|---|
| 907574 | 8/1972 | Canada | 220/9 |
| 1103624 | 6/1981 | Canada | 220/6 |
| 1922955 | 6/1965 | Fed. Rep. of Germany . | |
| 1928438 | 12/1965 | Fed. Rep. of Germany . | |
| 1967622 | 4/1967 | Fed. Rep. of Germany . | |
| 7121512 | 6/1971 | Fed. Rep. of Germany . | |
| 1551228 | 12/1968 | France . | |
| 2131392 | 6/1984 | United Kingdom | 383/29 |

Primary Examiner—Stephen P. Garbe
Attorney, Agent, or Firm—Seidel, Gonda, Goldhammer & Abbott

[57] ABSTRACT

A resealable reusable flexible plastic bag with a loop handle is disclosed for packaging heavy loads, for example large quantities of granular goods such as dog foods, in a sealed manner. The bag comprises flexible outer panels connected by a flexible gusset, inner flexible panels also connected by a flexible gusset, and a closure having flexible mating portions connected to the outer gusset. The outer gusset includes a frangible portion such as a line of perforations to facilitate access to the inner gusset. The inner gusset also includes a frangible portion to facilitate access to the goods therein. The flexible mating portions of the closure are separably connectable to each other to prevent access to the goods when connected and to facilitate access to the goods when separated.

18 Claims, 8 Drawing Figures

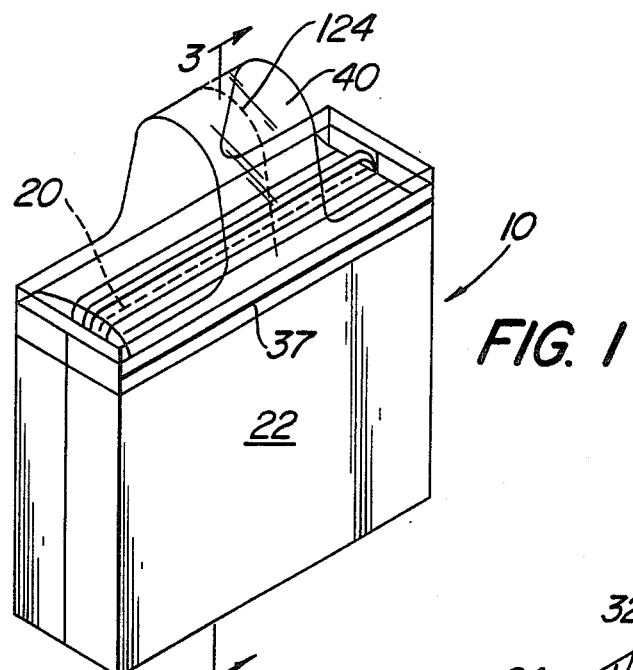
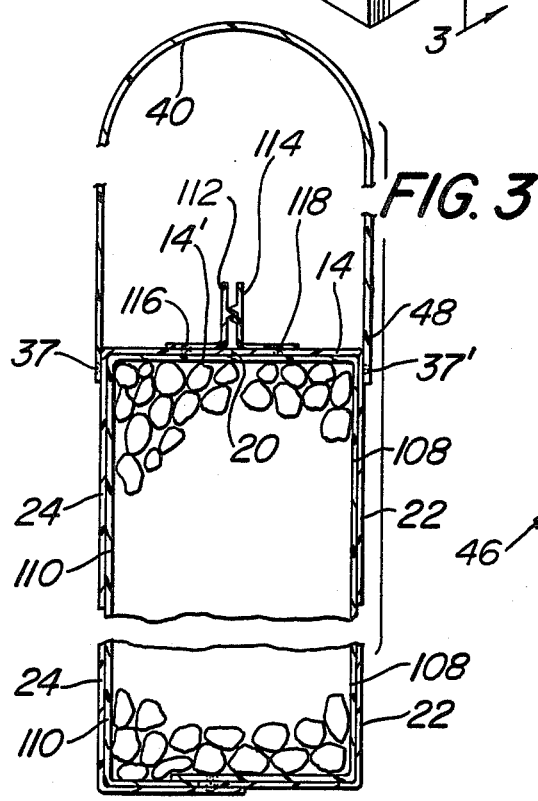
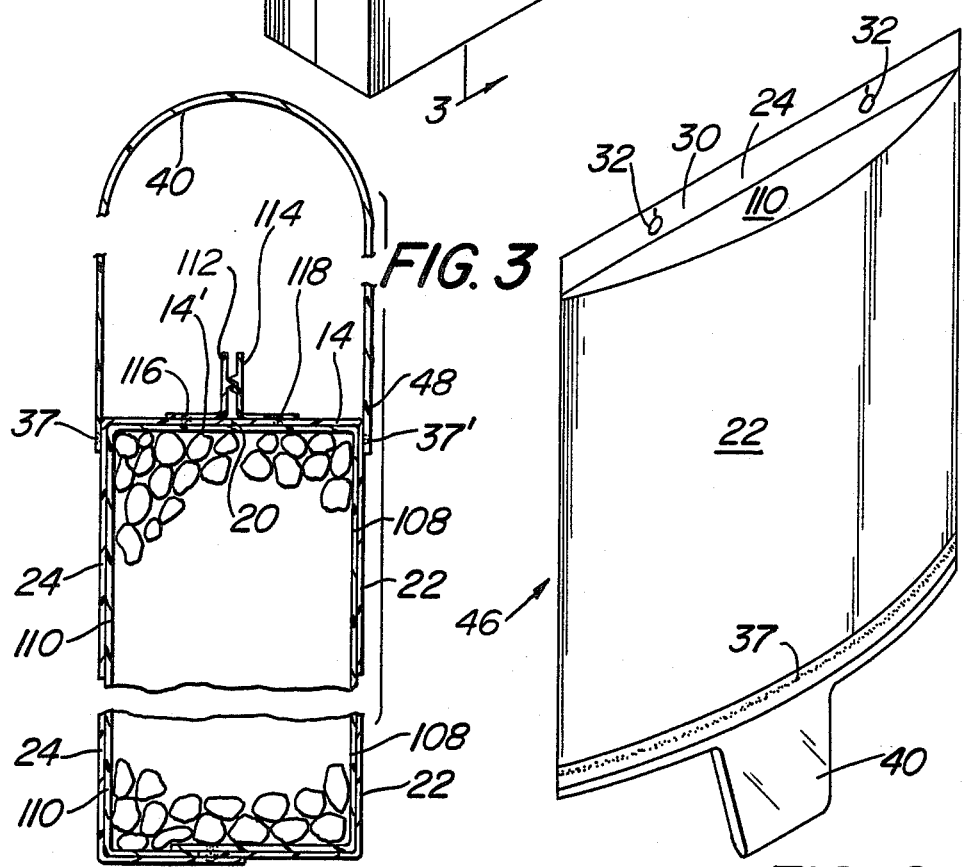

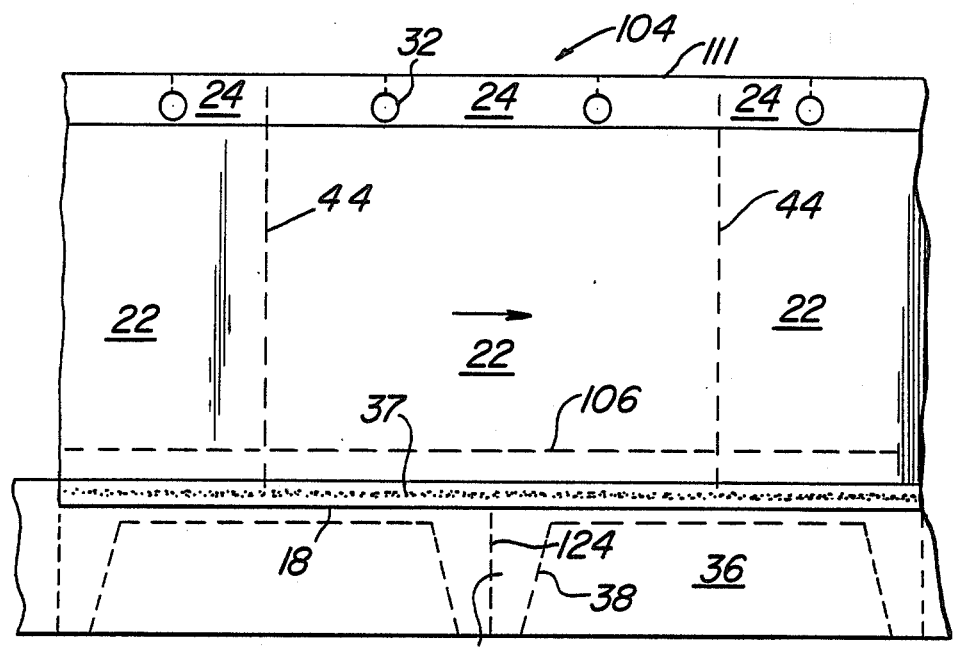
FIG. 4C
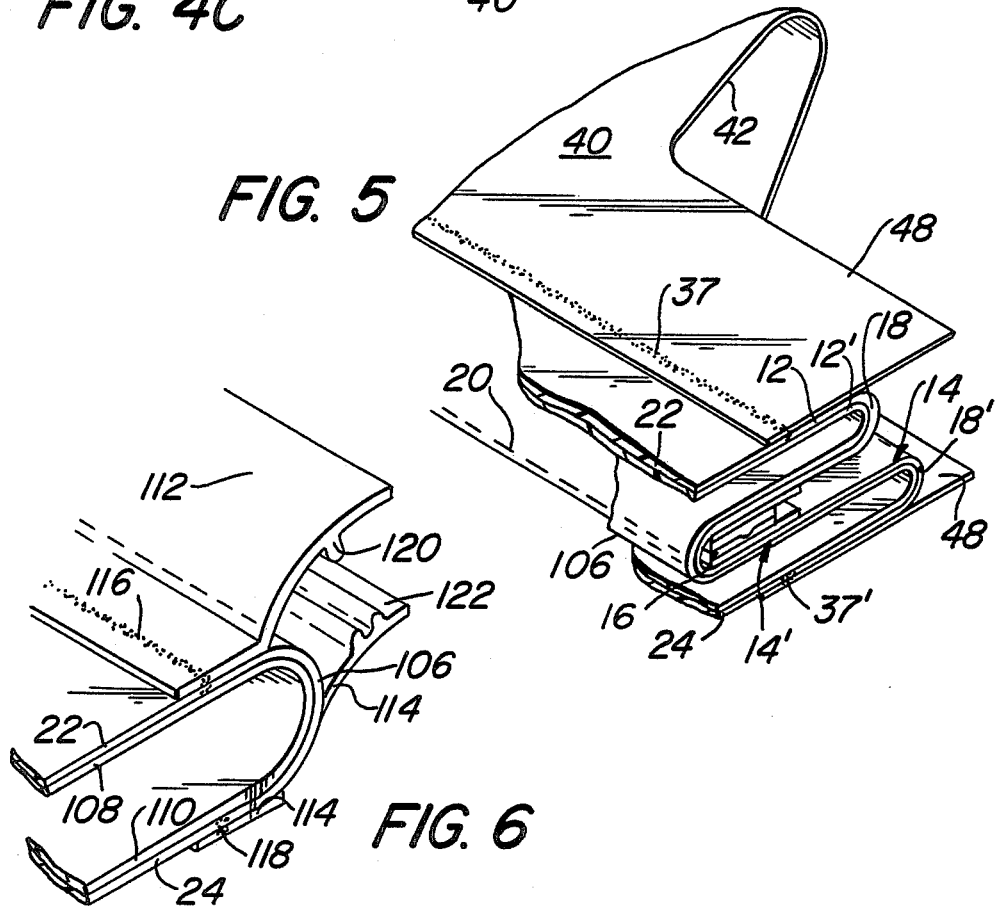
FIG. 5
FIG. 6

RESEALABLE REUSABLE FLEXIBLE PLASTIC BAG WITH LOOP HANDLE

RELATED APPLICATION

This is a continuation-in-part of copending application Ser. No. 388,381, now U.S. Pat. No. 4,573,203, filed June 14, 1982 in the name of the inventor herein assigned to the assignee herein.

BACKGROUND OF THE INVENTION

Flexible plastic bags of the general type involved herein are known. For example, see U.S. Pat. No. 4,252,269 and copending application Ser. No. 388,381, now U.S. Pat. No. 4,573,203, in the name of the inventor herein and owned by the assignee herein. When goods are packaged and sealed in the bag as disclosed in said patent, the bag is destroyed when one gains access to the contents of the bag. Such destruction of the bag is considered to be an unnecessary waste. In copending application Ser. No. 388,381 there is disclosed a flexible plastic bag which enables goods to be sealed therein while allowing the seal to be broken whereby the goods can be accessed and the bag reused without a seal. The present invention is directed to a solution of the problem of designing a flexible plastic bag which is capable of bearing heavy loads such as large quantities of granular goods sealed therein while allowing the seal to be broken whereby the goods can be accessed and the bag reused and resealed as well.

SUMMARY OF THE INVENTION

The present invention is directed to a bag having flexible generally rectangular front and rear outer panels and front and rear inner panels. A gusset connects the outer panels at a first end of the bag. Another gusset connects the inner panels at the first end of the bag. The ends of the inner and outer panels opposite the first end of the bag are open to facilitate introducing goods into the bag. The side edges of the inner and outer panels and the side edges of the gussets which connect the inner and outer panels are connected together so that the bag when filled can approximate the shape of a hexahedron with the outer gusset being flattened and closing the first end of the bag.

A handle, defined by a loop of flexible plastic material, is welded at each of its ends to a separate one of the outer panels, outside the outer gusset. At least a portion of the outer gusset is frangible so as to facilitate access to the inner gusset. At least a portion of the inner gusset is frangible so as to facilitate access to the goods in the bag. Closure means having first and second mating portions which are separably connectable to each other are connected to the outer gusset to prevent access to the goods in the bag when the mating portions are connected and to facilitate access to the goods when the mating portions are separated.

For the purpose of illustrating the invention, there is shown in the drawings a form which is presently preferred, it being understood, however, that this invention is not limited to the precise arrangements and instrumentalities shown.

BRIEF DESCRIPTION OF THE DRAWINGS

FIG. 1 is a perspective view of a filled package made from the bag of the present invention.

FIG. 2 is a perspective view of a bag in accordance with the present invention prior to filling.

FIG. 3 is a sectional view taken along the line 3—3 in FIG. 1.

FIG. 4C is a plan view of the composite web after the fold is inverted to form the inner and outer gussets and with the loop handle applied outside the outer gusset region.

FIG. 5 is a perspective view of a portion of the bag showing the inner and outer gussets at the closed end of the bag.

FIG. 6 is a perspective view of a portion of the composite web in FIG. 4B showing the closure means attached thereto.

DETAILED DESCRIPTION

Figure 4A:
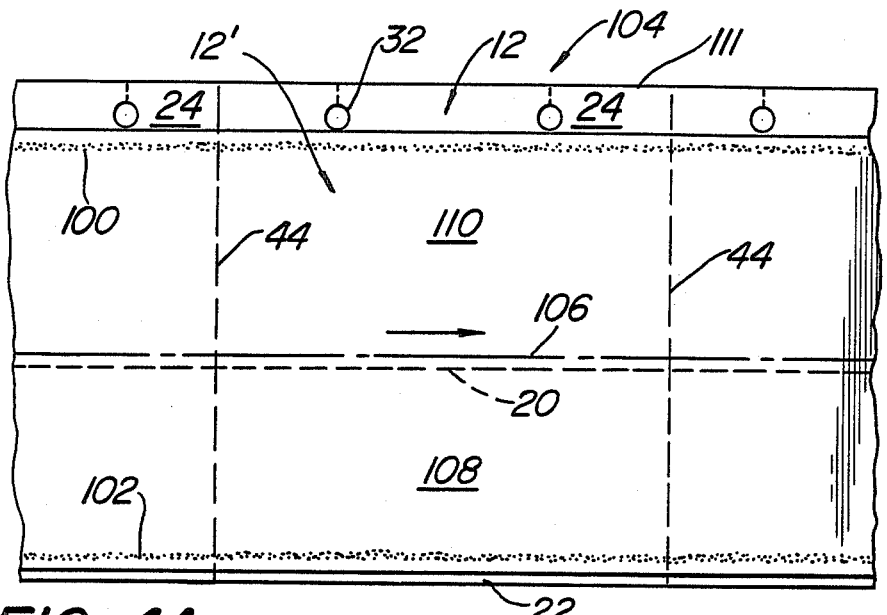
FIG. 4A is a plan view of the composite web from which the bag of the present invention is made and before the web is folded.

Referring to the drawings in detail, wherein like numerals indicate like elements, there is shown in FIG. 1 a package designated generally as 10, in the filled state, made from the bag of the present invention. The package is sealed so as to prevent access to the goods except in a manner which will be readily apparent and described in greater detail hereinafter.

Webs 12, 12' of flexiole thermoplastic material are placed one on top of the other and heat welded together at line welds 100, 102 to form a continuously moving composite web 104 as shown in FIG. 4A. The plastic material may be polypropylene, polyester, polyethylene, etc. Preferably, web 12 is opaque and web 12' is transparent. A transparent web 12' is preferred so that the goods within the package can be viewed before the seal on the bag is broken as described more fully hereafter.

Web 12 is provided with a line of perforations 20 proximal a fold line 106. The composite web 104 is then folded such that web 12 forms an outer bag structure while web 12' forms an inner bag structure. Thus, the composite web is first folded along fold line 106 so as to form an outer front panel 22 and an outer rear panel 24, an inner front panel 108 and an inner rear panel 110. See FIG. 4B. The composite web is then folded inwardly along fold line 106 to form an outer gusset connecting the outer panels and designated generally as 14 and an inner gusset connecting the inner panels and designated generally as 14'. See FIG. 4C and FIG. 5. The outer gusset 14 has an inner boundary portion 16 and outer boundary portions 18, 18'. The perforations 20 lie along the inner boundary portion 16 of outer gusset 14 so that they are accessible to the user.

The web 12 and consequently the outer panels 22 and 24 are preferably composed of a laminate of an inner layer and an outer layer as described in copending application Ser. No. 388,381. Use of a laminate provides a choice of different materials having different properties. The inner layer is preferably opaque and has printing on its outer surface. The outer layer is transparent and is adhesively or otherwise bonded to substantially the entire inner layer surface and overlies the printing to protect the same. Preferred dimensions and materials are an inner layer of white opaque polyethylene havinq a thickness ot 0.00125 inches while the ourer layer is clear polyethylene having a thickness of 0.00175 inches.

Figure 4B:
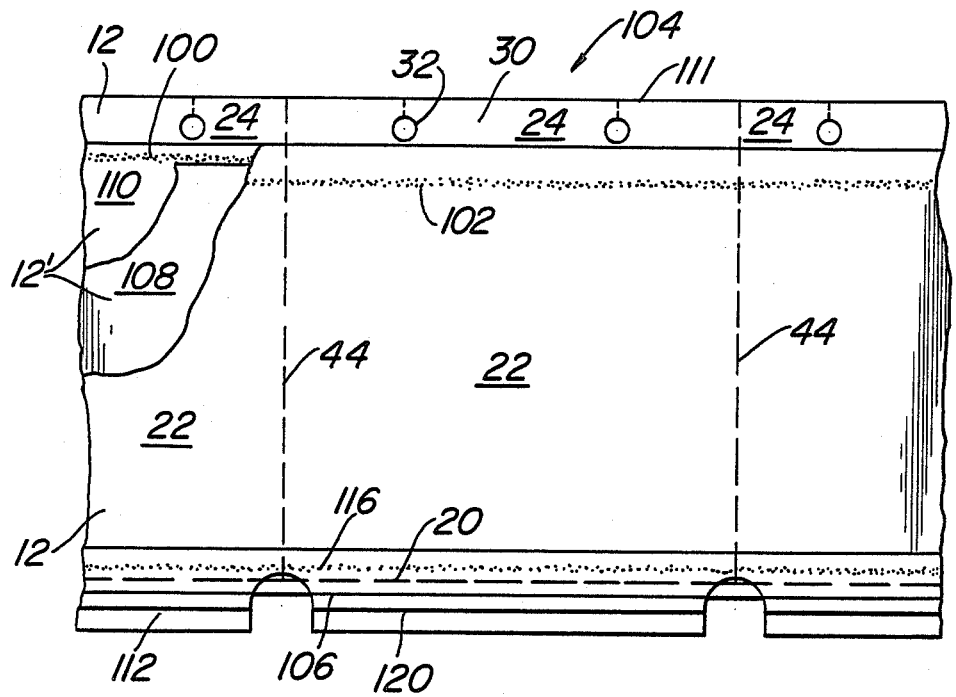
FIG. 4B is a plan view of the composite web after the web is folded with the closure means attached to the web.

As shown in FIG. 4B, when the composite web 104 is folded over, the outer front panel 22 is shorter in height than the outer rear panel 24 whereby the rear panel has a tab 30 projecting beyond the front panel 22. Within the tab 30 there are provided arcuate perforations defining one or more holes 32 with perforation lines connecting the holes to the tab edge 111.

Referring to FIG. 4B and FIG. 6, after the composite web 104 is folded, webs 112, 114 of thin transparent flexible thermoplastic material are secured by line welds 116, 118 to the outer panels 22, 24 on opposite sides of fold line 106. Webs 112, 114 are preformed with mating portions 120, 122 which enable the webs to be separably connected to each other by means of a press-lock fit. As shown more clearly in FIG. 6, mating portion 120 on web 112 is in the shape of a longitudinally extending rib and mating portion 122 on web 114 is in the form of a pair of flexible longitudinally extending walls defining a groove whereby portion 122 is adapted to frictionally engage the rib. Preferably, the rib is seated in the groove, releasably securing webs 112, 114 together before the webs are welded to the outer panels 22, 24.

The composite web is then folded inwardly to form the gussets 14, 14'. See FIG. 4C.

A web 36 of flexible transparent thermoplastic material is then applied to composite web 104 as shown in FIG. 4C. Web 36 is folded over so as to be generally U-shaped with the edge portions of the web overlying the outer panels 22, 24 outside the outer boundary portions 18, 18' of gusset 14. See also FIG. 5. Thus, one edge portion of web 36 overlies outer front panel 22 while the other edge portion of the web overlies outer rear panel 24. Web 36 is welded to outer panels 22, 24 along zones such as weld lines 37, 37'. Thereafter, the web 36 is die cut at 38 so as to delineate a handle 40 centrally located with respect to the outer front and rear panels. The handle 40 is in the form of a loop and is provided with a line of perforations 124 which bisects the handle. Preferably, handle 40 is narrower at its bight and has a total length which is longer than the width of outer gusset 14 so that the loop can be slipped over a person's arm when the bag is filled as shown in FIG. 1.

Thereafter, the composite web 104 is cut along lines 44 and welded along a narrow margin centered on each line to thereby form the discrete bag 46 as shown in FIG. 2. Lines 44 identify the side edges of the bag 46. Note that both webs 112, 114 are preferably notched as shown in FIG. 4B so that their side edges are welded to the side edges of panels 22, 24 without interference with rib portion 120 or grooved portion 122. Webs 112, 114 on each bag form a closure device which is resealable.

The bag 46 as shown in FIG. 2 may be loaded as a stack of bags on a bagging machine with prongs extending through the aligned holes 32. When product is machine fed into the bag 46, it is done with sufficient force so as to strip the bag 46 off the prongs and thereby tear the tab 30 from holes 32 to the edge 111 of the tab. At the same time, the air within the bag is forced out of the vent holes 34. After the bag is filled, it is sealed at its bottom end proximal tab 30 by heat welding.

Handle 40 is preferably made from 0.005 inch thick transparent plastic material such as polyethylene so that it does not obscure the printing on the exposed surface Of the outer gusset 14 as can be seen from FIG. 1. The only remaining portion of the web 46, other than the handle 40, is the flange 48 which preferably extends across the full width of the front and rear panels of the bag and is welded thereto. Preferably, the widest portion on the handle 40 is adjacent the flanges 48. At the location where the handle merges into the flange 48, it is defined by an arcuate surface as shown more clearly in FIG. 5.

It should be readily appreciated that the bag 46 is assembled from only four separate webs, the inner and outer webs 12, 12', the locked webs 112, 114 which form the closure device, and the handle web 36. Thus, the bag 46 is assembled in a manner whereby it may be made continuously along a production line.

The bag 46 is capable of being machine loaded with goods which cause the package 10 to approximate a hexahedral shape whereby the bag may be conveniently stacked with the outer (printed) panels prominently displayed. The flexible loop type carrying handle allows the bag to be easily carried off the shelf, in its filled state, merely by slipping the loop handle over a person's arm.

The inner panels 108, 110 and inner gusset 14' form a sturdy inner bag structure for retaining the goods. See FIG. 3. Heavy loads, for example large quantities of granular goods such as dog food, may be loaded in the inner bag structure which tends to prevent the aroma and/or grease content of the goods from entering the outer bag structure formed by outer panels 22, 24 and outer gusset 14.

The bag is constructed in a manner whereby access may be had to the product contained within the inner bag by first pulling the loop handle 40 apart at perforations 124, then peeling open the closure device formed by webs 112, 114, then opening the outer gusset 14 by tearing the perforations 20, and then severing the inner gusset 14' (using scissors or the like) which is made of a flexible plastic material such as polyethylene and which is therefore frangible. Such access does not destroy the utility of the bag. Once the contents of the inner bag are depleted, the bag may be re-used as a shopping bag wherein articles may be loaded in the inner bag via the opening formed by severing inner gusset 14'. The webs 112, 114 may be re-connected at their mating portions so as to reseal the bag before the contents are fully depleted or, afterwards, when the bag is used as a shopping bag.

The present invention may be embodied in other specific forms without departing from the spirit or essential attributes thereof and, accordingly, reference should be made to the appended claims, rather than to the foregoing specification, as indicating the scope of the invention.

I claim:

1. A resealable reusable flexible plastic bag comprising an outer unitary piece of flexible plastic material including generally rectangular front and rear plastic panels and a gusset connecting said panels at a first end portion of the bag, an inner unitary piece of flexible plastic material including generally rectangular front and rear panels and a gusset connecting said last-mentioned panels at said first end portion of the bag, the ends of said inner and outer unitary pieces of flexible plastic material opposite said first end of the bag being open to facilitate introducing goods into the bag, the side edges of said gussets and said panels being connected together in a manner so that the bag when filled can approximate the shape of a hexahedron with said gusset of said outer piece of flexible plastic material being flattened and closing said first end portion of the bag, a handle defined by a loop of flexible plastic material having ends and being secured at each of its ends to a separate one of said panels of said outer piece of flexible plastic material adjacent said gusset of said outer piece of flexible plastic material, at least a portion of each of said gussets being frangible so as to facilitate access to the goods in the bag and thereafter permit reuse of the bag, and closure means having first and second mating portions separably connectable to each other and connected to said gusset of said outer piece of flexible plastic material so as to prevent access to the goods in the bag when said mating portions are connected together and for facilitating access to the goods in the bag when said mating portions are separated.

2. A bag according to claim 1 wherein said frangible portion of said gusset of said outer piece of flexible plastic material is defined by perforations.

3. A bag according to claim 1 wherein at least a portion of said loop is frangible.

4. A bag according to claim 3 wherein said frangible portion of said loop is defined by perforations.

5. A bag according to claim 1 wherein said first and second mating portions of said closure means includes a rib on one of said mating portions and a groove on the other of said mating portions, said rib being frictionally engagable in said groove to provide a separable connection.

6. A bag according to claim 1 wherein said first and second mating portions of said closure means are made of a flexible transparent plastic material.

7. A bag according to claim 1 wherein said handle is provided with a flange at each end of said loop, each flange having a length substantially equal to the width of said panels of said outer piece of flexible plastic material, each flange being secured to a separate one of said panels of said outer piece of flexible plastic material.

8. A bag according to claim 1 wherein the length of said loop is longer than the width of said gusset of said outer piece of flexible plastic material whereby the loop can be slipped over a person's arm when the bag is filled.

9. A resealable reusable flexible plastic bag comprising a unitary piece of flexible plastic material having ends and including generally rectangular front and rear plastic panels and a gusset connecting said panels at a first end of the bag, the ends of said unitary piece of flexible plastic material opposite said first end of the bag being open to facilitate introducing goods into the bag, the side edges of said gusset and said panels being connected together in a manner so that the bag when filled can approximate the shape of a hexahedron with said gusset being flattened and closing said first end of the bag, a handle defined by a loop of flexible plastic material having ends and secured at each of its ends to a separate one of said panels adjacent said gusset, at least a portion of said gusset being frangible so as to facilitate access to the goods in the bag and thereafter permit reuse of the bag, and closure means having first and second mating portions separately connectable to each other and secured to said gusset so as to prevent access to the goods in the bag when said mating portions are connected together and for facilitating access to the goods in the bag when said mating portions are separated.

10. A bag according to claim 9 wherein said frangible portion of said gusset is defined by perforations.

11. A bag according to claim 9 wherein at least a portion of said loop is frangible.

12. A bag according to claim 11 wherein said frangible portion of said loop is defined by perforations.

13. A bag according to claim 9 wherein said first and second mating portions of said closure means includes a rib on one of said mating portions and a groove on the other of said mating portions, said rib being frictionally engageable in said groove.

14. A bag according to claim 9 wherein said first and second mating portions of said closure means are made of a flexible transparent plastic material.

15. A bag according to claim 9 wherein said handle is provided with a flange at each end of said loop, each flange having a length substantially equal to the width of said panels, each flange being secured to a separate one of said panels of said outer piece of flexible plastic material.

16. A bag according to claim 9 wherein the length of said loop is longer than the width of said gusset whereby the loop can be slipped over a person's arm when the bag is filled.

17. A bag according to claim 1 wherein said handle defined by said loop of plastic material being welded at each of its ends to a separate one of said panels of said outer piece of flexible plastic material outside gusset of said outer piece of flexible plastic material.

18. A bag in accordance with claim 9 wherein said handle being defined by said loop of flexible plastic material secured at each of its ends to a separate one of said panels outside said gusset.

* * * * *